(12) United States Patent
Tajan

(10) Patent No.: US 9,435,437 B2
(45) Date of Patent: Sep. 6, 2016

(54) ROTATING SEALING DEVICE AND SEALING RING FOR SUCH DEVICE

(75) Inventor: Emmanuel Tajan, Tulle (FR)

(73) Assignee: NEXTER MECHANICS, Versailles (FR)

( * ) Notice: Subject to any disclaimer, the term of this patent is extended or adjusted under 35 U.S.C. 154(b) by 0 days.

(21) Appl. No.: 14/234,831

(22) PCT Filed: Jul. 25, 2012

(86) PCT No.: PCT/FR2012/000309
§ 371 (c)(1),
(2), (4) Date: Mar. 12, 2014

(87) PCT Pub. No.: WO2013/017745
PCT Pub. Date: Feb. 7, 2013

(65) Prior Publication Data
US 2014/0183826 A1    Jul. 3, 2014

(30) Foreign Application Priority Data
Aug. 2, 2011   (FR) ..................................... 11 02417

(51) Int. Cl.
B60C 29/00    (2006.01)
F16J 15/48    (2006.01)
B60C 23/00    (2006.01)
F16J 15/18    (2006.01)

(52) U.S. Cl.
CPC ............... *F16J 15/48* (2013.01); *B60C 23/003* (2013.01); *F16J 15/18* (2013.01)

(58) Field of Classification Search
USPC ........ 277/500, 510, 578, 589; 152/415, 416, 152/417
See application file for complete search history.

(56) References Cited

U.S. PATENT DOCUMENTS

| 1,089,789 | A | * | 3/1914 | Ramberg | 277/510 |
| 3,126,207 | A | * | 3/1964 | Eikelberner | 277/346 |
| 3,186,724 | A | * | 6/1965 | Wheatley | 277/510 |
| 4,924,926 | A | * | 5/1990 | Schultz et al. | 152/417 |

(Continued)

FOREIGN PATENT DOCUMENTS

| EP | 1 095 799 A1 | 5/2001 |
| EP | 2 308 698 A2 | 4/2011 |

(Continued)

OTHER PUBLICATIONS

Oct. 11, 2012 Search Report issued in International Patent Application No. PCT/FR2012/000309.

*Primary Examiner* — Kristina Fulton
*Assistant Examiner* — Eugene G Byrd
(74) *Attorney, Agent, or Firm* — Oliff PLC

(57) ABSTRACT

The invention relates to rotating sealing device for the passage of a fluid, including at least one seal positioned between a fixed support and a crown mounted able to rotate with respect to the support. This device is characterized in that the seal is constituted by a ring mounted able to slide in a groove in the fixed support and which incorporates a front face intended to come into contact with a bearing surface of the rotating crown, the incorporating on each of its internal and external cylindrical surfaces at least one ring-shaped groove intended to accommodate an O-ring seal. The ring can, additionally, by pressed against the bearing surface by positioning means exerting a thrust force on the rear face of the ring. The invention applies in particular for a system to inflate the tires of vehicles.

14 Claims, 9 Drawing Sheets

(56) References Cited

U.S. PATENT DOCUMENTS

Figure 1:
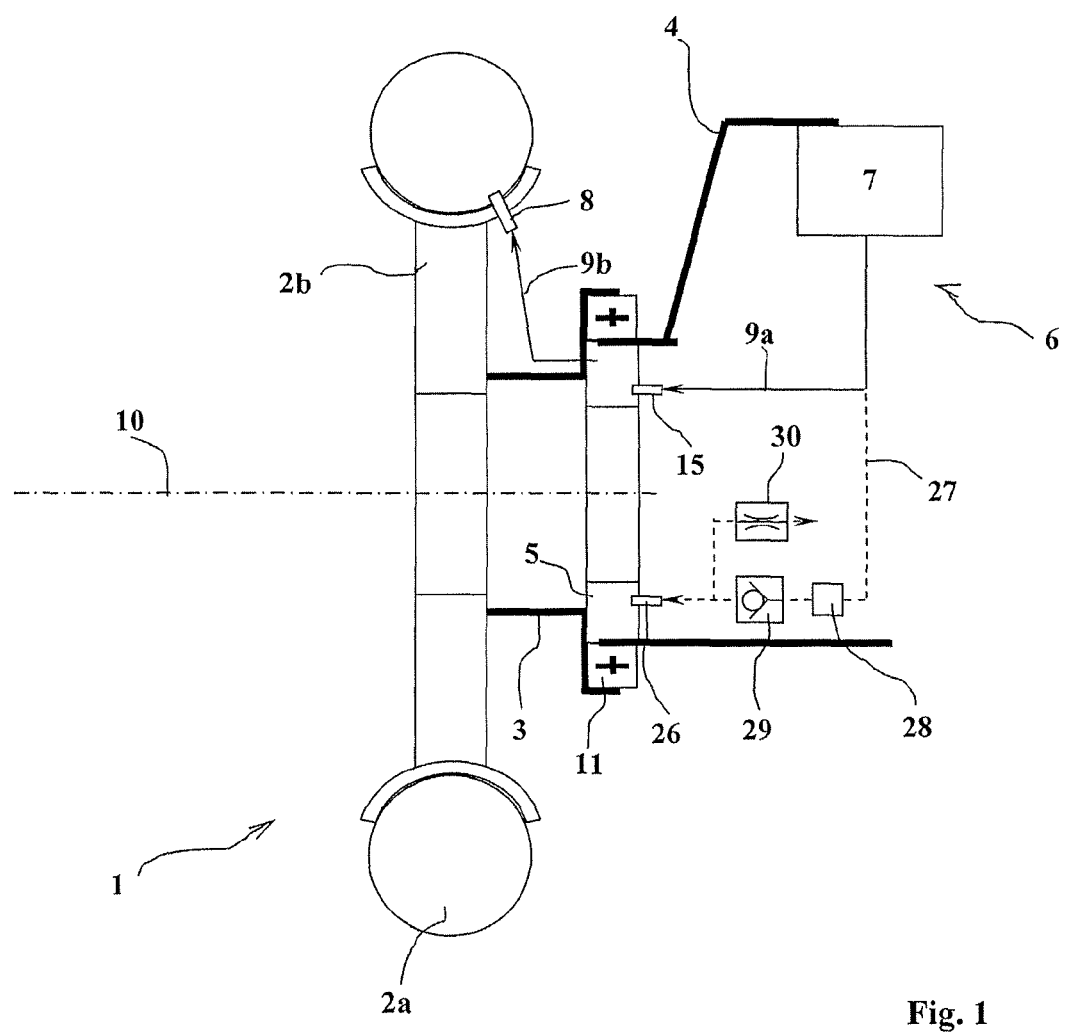

| | | | |
|---|---|---|---|
| 4,936,197 A * | 6/1990 | Brent | 92/168 |
| 5,145,340 A * | 9/1992 | Allard | 417/568 |
| 5,429,167 A * | 7/1995 | Jensen | 152/417 |
| 5,868,881 A | 2/1999 | Bradley | |
| 6,439,044 B1 * | 8/2002 | Tigges | 73/146.2 |
| 6,857,457 B2 * | 2/2005 | Nienhaus | 152/417 |
| 6,892,778 B2 * | 5/2005 | Hennig et al. | 152/415 |
| 2003/0214100 A1 * | 11/2003 | Pippert | 277/510 |
| 2004/0150168 A1 | 8/2004 | Heathcott et al. | |
| 2004/0227302 A1 * | 11/2004 | Burdick et al. | 277/510 |
| 2004/0238093 A1 * | 12/2004 | Nelson et al. | 152/415 |
| 2008/0240963 A1 * | 10/2008 | Kimura et al. | 418/104 |
| 2009/0211682 A1 * | 8/2009 | Sobotzik | 152/415 |
| 2010/0065177 A1 * | 3/2010 | Saadat | 152/417 |
| 2010/0156050 A1 * | 6/2010 | Heinrich et al. | 277/346 |

FOREIGN PATENT DOCUMENTS

| | | |
|---|---|---|
| FR | 2 731 655 A1 | 9/1996 |
| WO | WO 00/15451 A1 | 3/2000 |

\* cited by examiner

ROTATING SEALING DEVICE AND SEALING RING FOR SUCH DEVICE

The technical scope of the invention is that of rotating sealing devices associated with the passage of a fluid, and in particular devices implemented in wheel inflation systems.

It is known to produce system to manage the inflation and deflation of tyres. These systems enable the pressure inside the tyres to be adjusted at will as the vehicle is moving.

Patent FR-2731655 describes such an inflation/deflation system. Known systems must enable the passage of a fluid pressure (in this case, air) between a fixed part (the chassis of the vehicle) and a rotating part (the wheel).

To be able to successfully inflate the tyre, it is necessary to be able to ensure air pressure tightness during the passage of this fluid from the fixed part to the mobile part.

To perform this air tightness, it is known according patent FR-2731655 to implement rotating seals with flexible lips. These seals are, however, complicated in structure and they are costly. Furthermore, they are adapted to the sealing of relatively small diameters (less than 100 mm).

There is a need, however, to produce sealing for larger diameters, in particular for inflation and deflation systems for heavy machinery, such as trucks, agricultural machinery or construction vehicles.

Known solutions further involve the sealing lip to be permanently pressed onto its seat. This results in rapid wear requiring the seals to be replaced.

The aim of the invention is to propose a rotating sealing device, device able to be easily implemented for large diameters of rotating parts (over 100 mm).

The device according to the invention further enables the reduction of wear by friction of the sealing ring, thereby enabling the device to be used for long periods without the need to replace the sealing rings.

The device according to the invention may naturally be implemented for diameters of less than 100 mm, in any case it ensures sealing with a reduction in friction and wear.

The invention also relates to a sealing ring associated with such a device.

Thus, the invention relates to a rotating sealing device for the passage of a fluid, in particular for a system to inflate the tyres of vehicles, device comprising at least one seal positioned between a fixed support and a crown mounted able to rotate with respect to the support, the seal being constituted by a ring mounted able to slide in a groove in the support and which incorporates a front face intended to come into contact with a bearing surface of the rotating crown, the ring being able to be applied against the bearing surface by positioning means exerting a thrust force on a rear face of the ring, device wherein the ring incorporates on each of its internal and external cylindrical surfaces at least one ring-shaped groove able to accommodate an O-ring.

According to one embodiment, the ring incorporates at least one bore linking its rear face and its front face and enabling the passage of a fluid, through the ring, between the fixed support and the rotating crown.

The front face may incorporate a circular median channel into which the bore opens out.

According to another embodiment, the positioning means are constituted by spring means placed between the rear face of the ring and the support.

The spring means may thus be constituted by at least one spring washer.

Alternatively, the spring means may be constituted by at least one sealing ring housed in a circular groove arranged in the rear face of the ring.

According to another embodiment, the positioning means are constituted by fluid pressure applied to the rear face of the ring through an opening in the support.

The fluid pressure may be applied via a non-return valve and a pressure regulator, a certain pressure level being thus maintained between the support and the rear face of the ring.

According to one variant, the device incorporates a calibrated leak orifice connecting the ring-shaped groove and the exterior.

The invention also relates to a sealing ring intended to be implemented in such a rotating sealing device.

This ring incorporates a front face intended to come into contact with a rotating bearing surface and a rear face which is intended to receive a thrust force supplied by positioning means, ring wherein it incorporates on each of its internal and external cylindrical surfaces at least one ring-shaped groove intended to accommodate an O-ring.

The ring may incorporate at least one bore linking its rear face and its front face, the bore opening out on the front face into a circular median channel.

The sealing ring may incorporate a ring-shaped rear part thinner than a ring-shaped front part, the surface area of the rear face being equal to that of the bottom of the median channel in the front face.

The sealing ring will advantageously be made of an organic material with a low coefficient of friction, such as polytetrafluoroethylene, a material with high graphite content.

The sealing ring may incorporate a metallic body onto which a bushing of an organic material with a low coefficient of friction will be fixed.

Figure 2A:
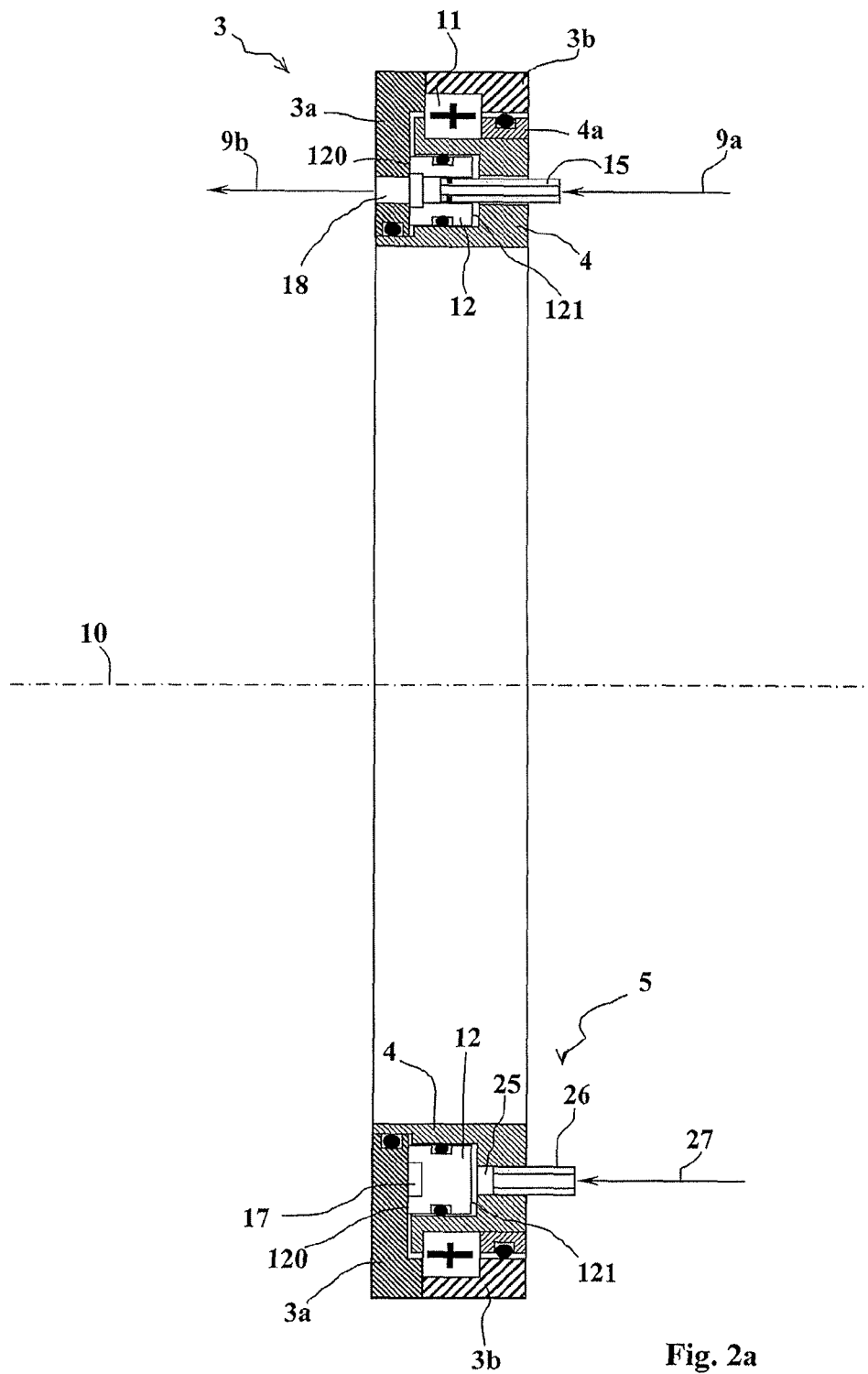
Figure 2B:
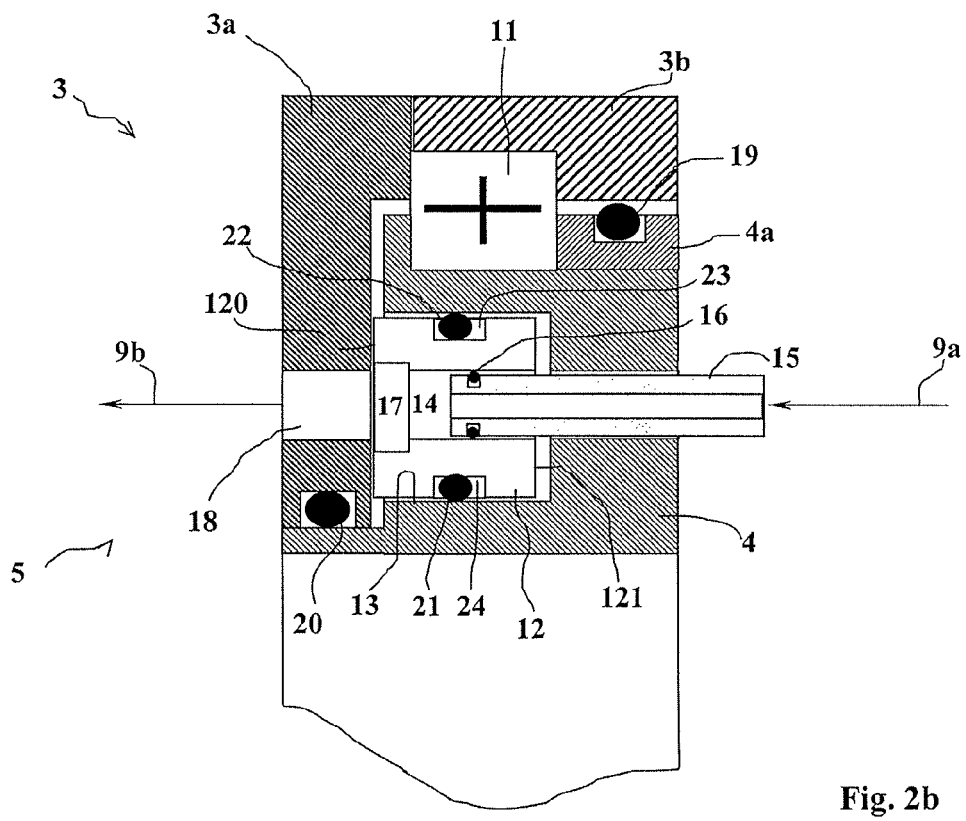
Figure 2C:
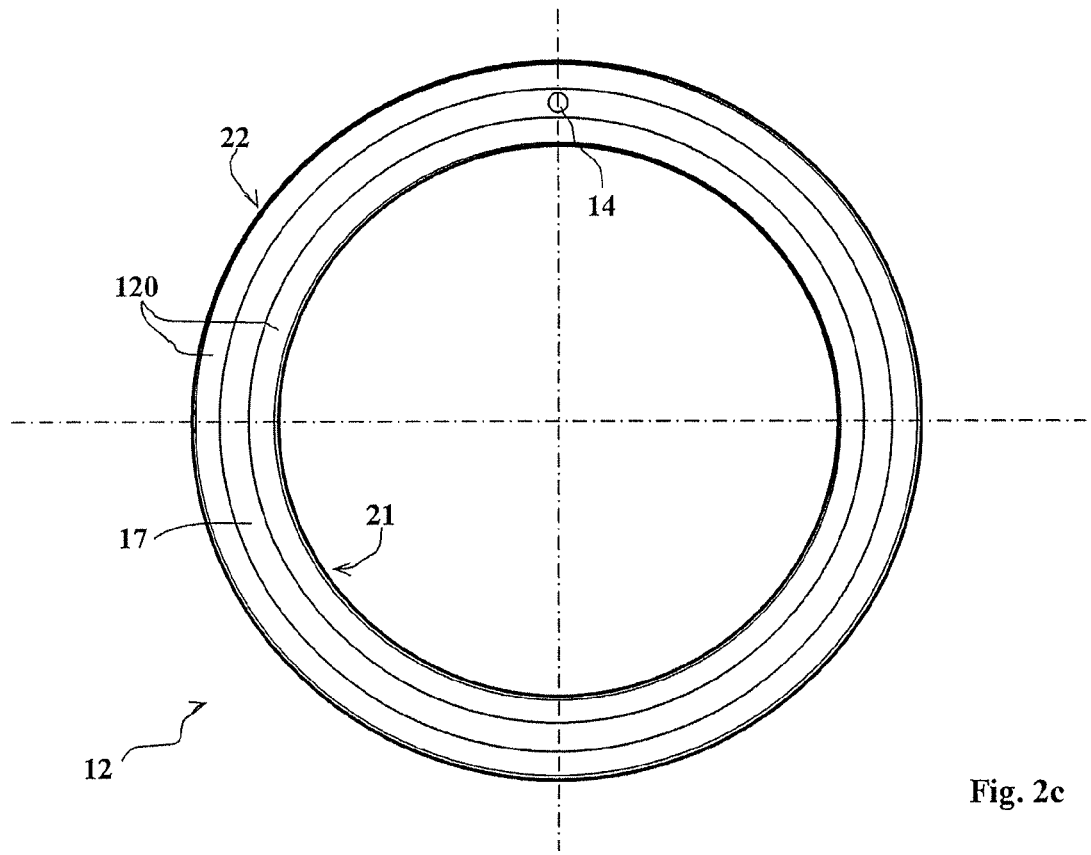
Figure 3A:
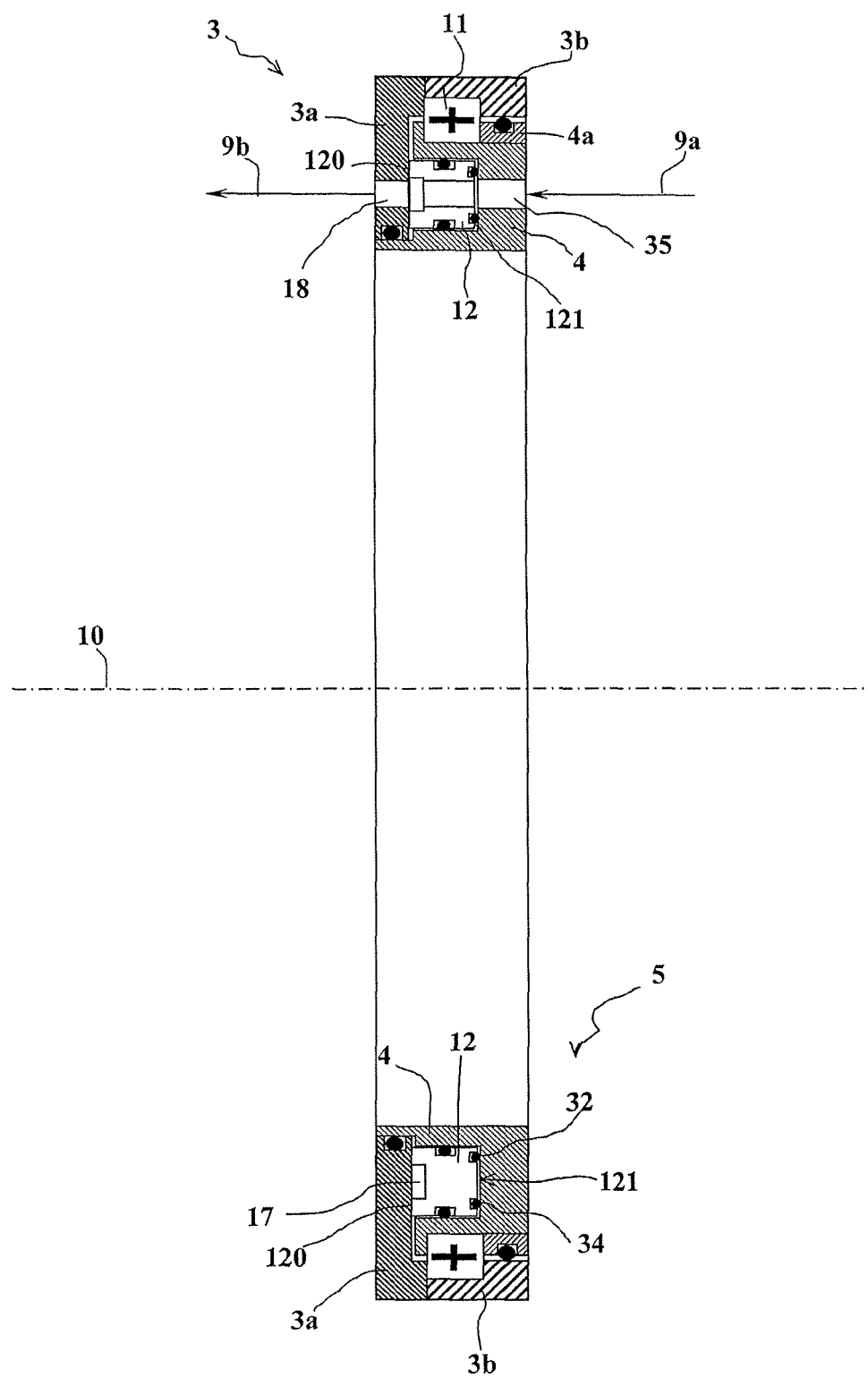
Figure 3B:
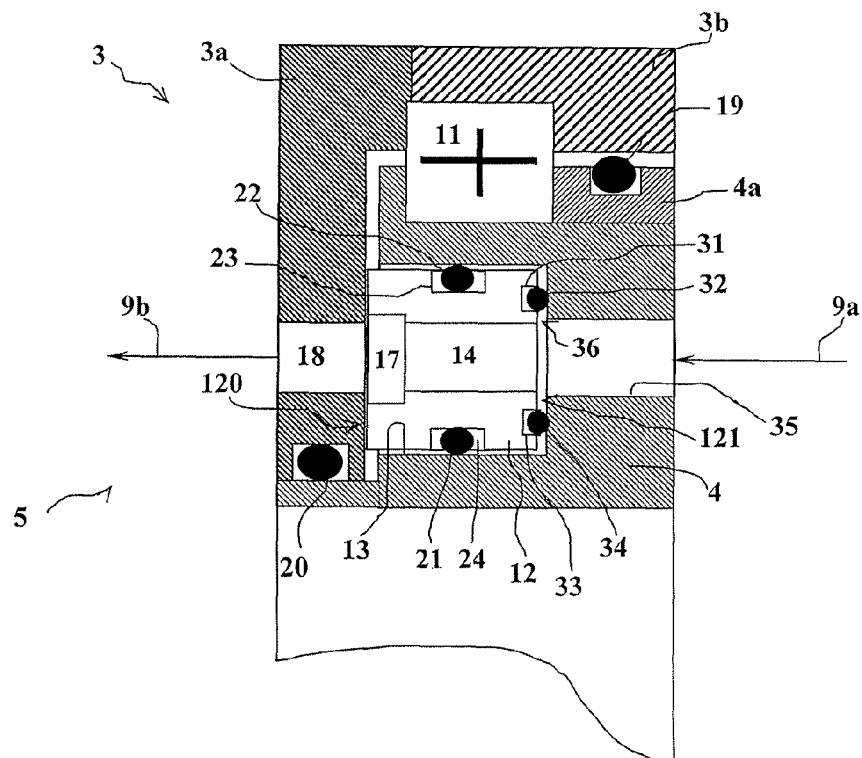
Figure 4:
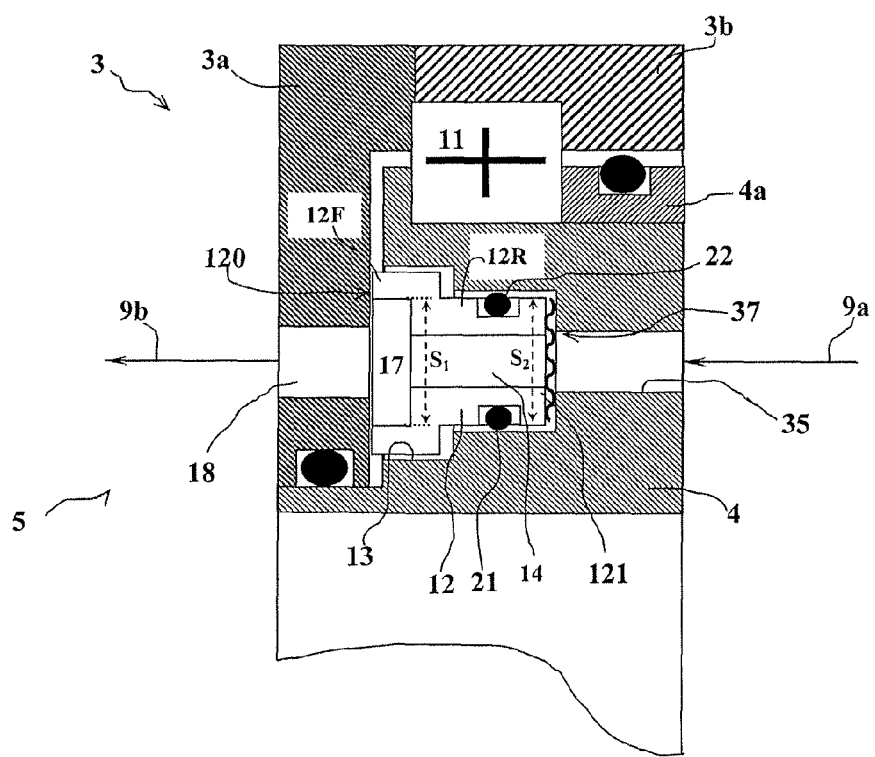
Figure 5:
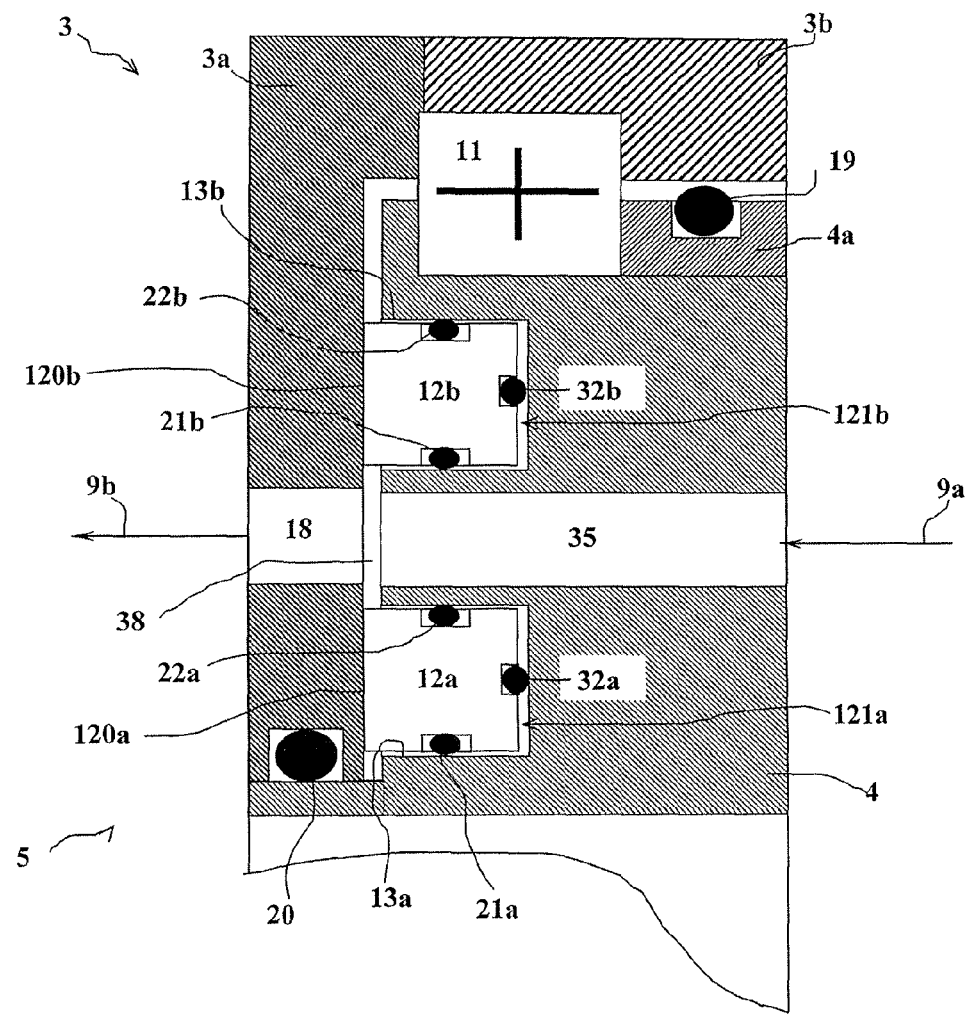
Figure 6:
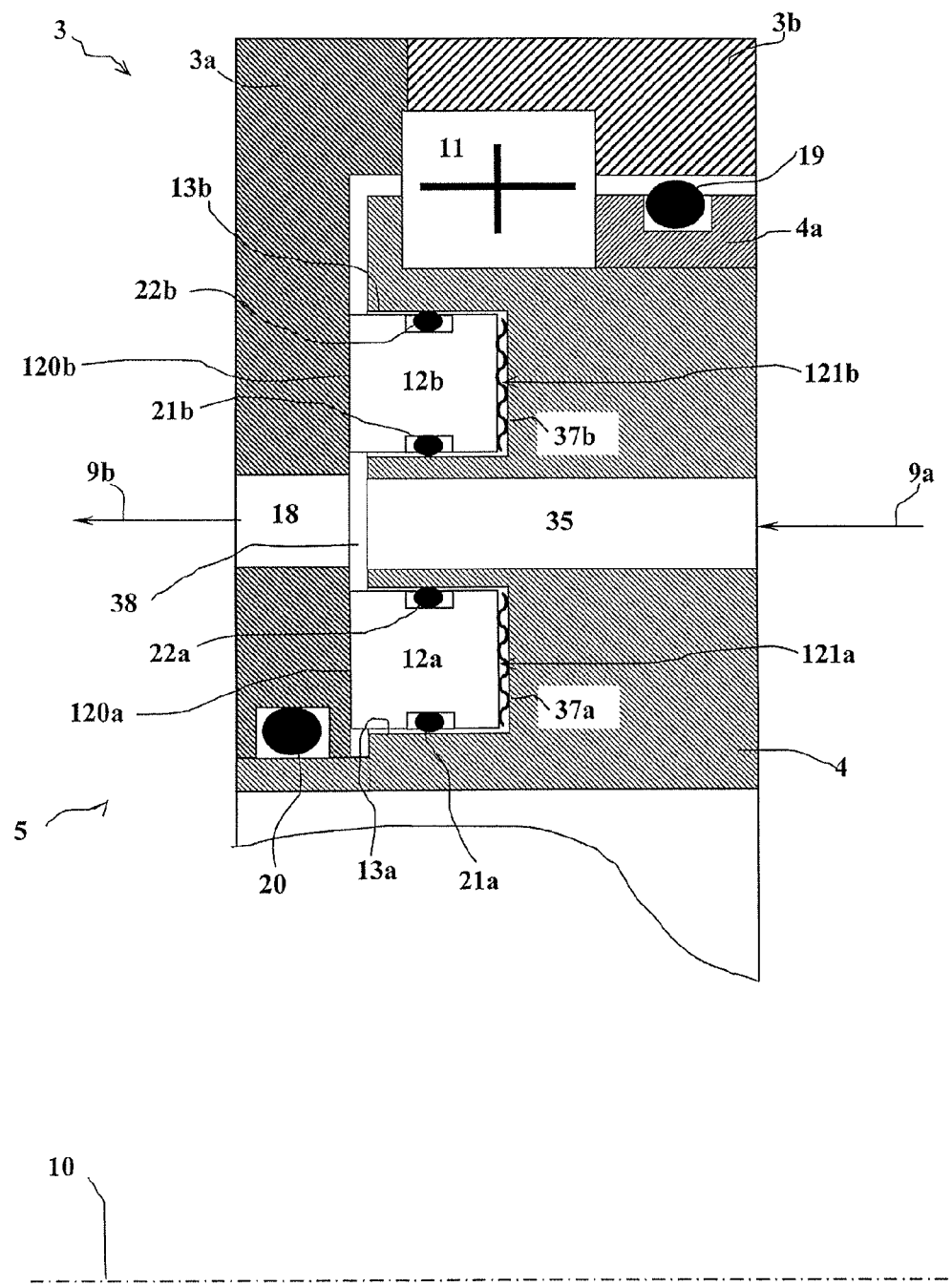
Figure 7:
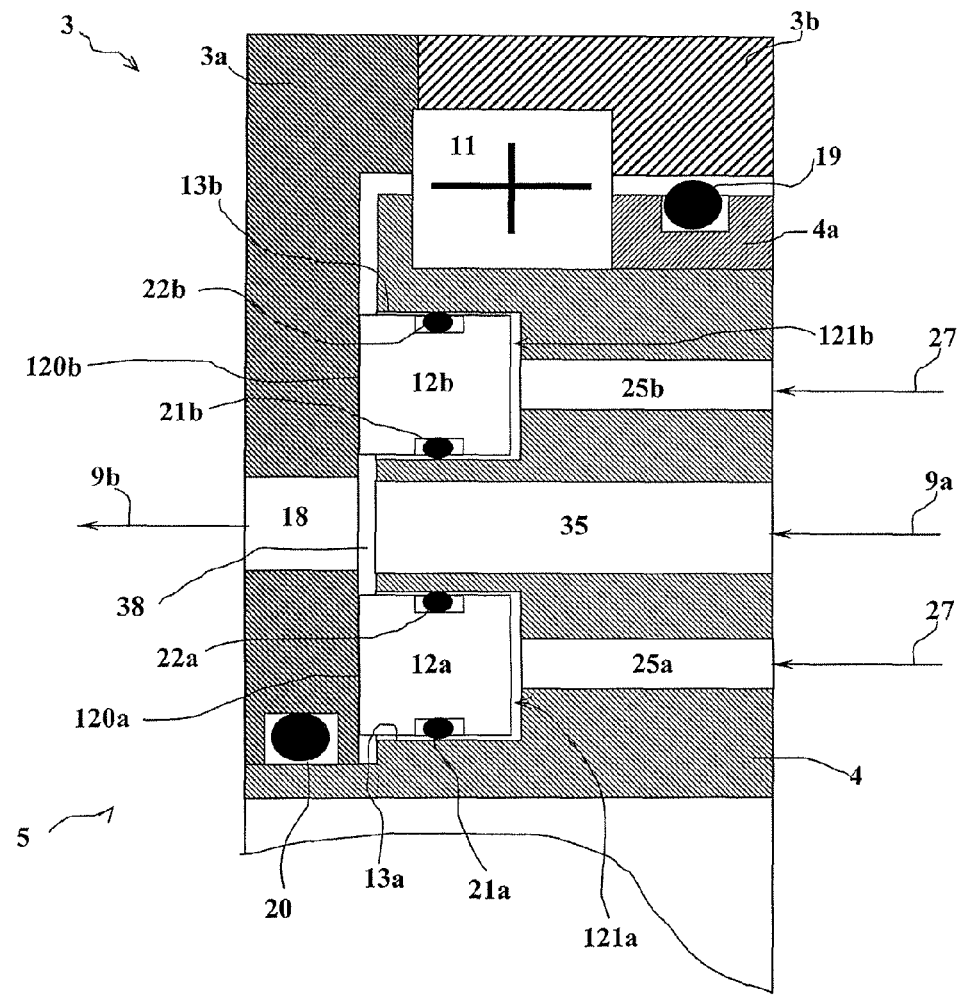
Figure 8A:
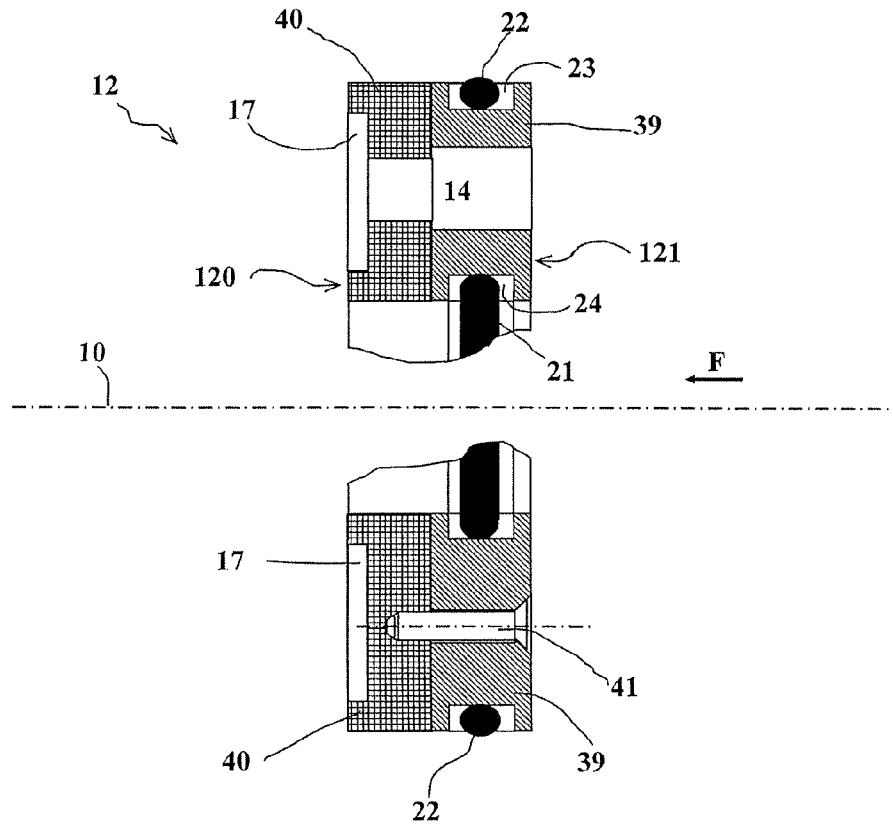
Figure 8B:
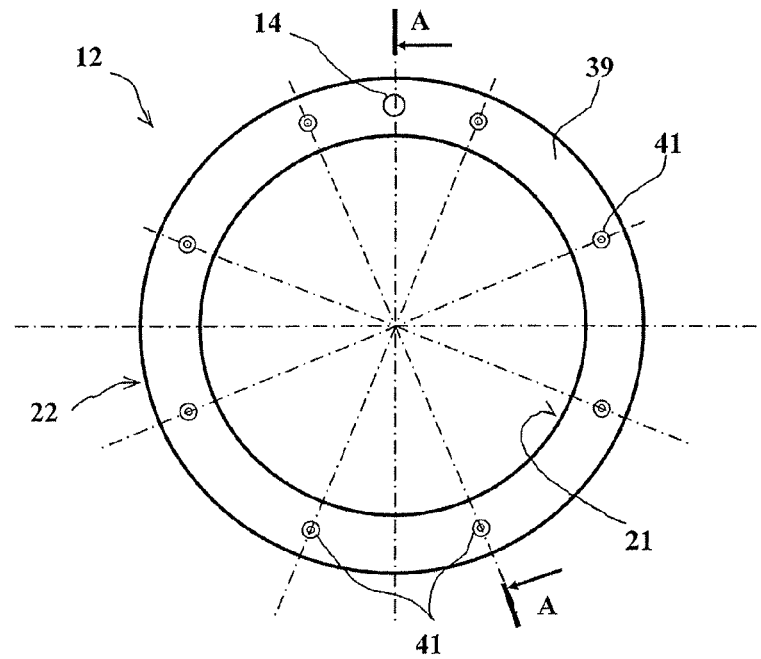

The invention will become more apparent from the following description of the embodiments, such description being made with reference to the appended drawings, in which:

FIG. 1 is an overall schema showing the installation of a sealing device according to the invention in a tyre inflating system for a vehicle, FIG. 2a is a partial section view of a first embodiment of a rotating sealing device according to the invention, FIG. 2b is an enlarged partial view of this first embodiment, FIG. 2c is a front view of the sealing ring alone (seen from the front face side), FIG. 3a is a partial section view of a second embodiment of a rotating sealing device according to the invention, FIG. 3b is a partial enlarged view of this second embodiment, FIG. 4 is a partial enlarged view of a variant of this second embodiment, FIG. 5 is a partial enlarged view of a third embodiment, FIG. 6 is a partial enlarged view of a variant of this third embodiment, FIG. 7 is a partial enlarged view of a fourth embodiment of the invention, and FIGS. 8a and 8b show another embodiment of a ring according to the invention, FIG. 8a being a partial section along the broken planes marked AA in FIG. 8b, and FIG. 8b being a view of this ring from its rear face side (view according to arrow F in FIG. 8a).

FIG. 1 schematically show the wheel 1 of a vehicle (not shown) that comprises a tyre 2a fixed to a wheel rim 2b. A crown 3 is integral with the wheel rim 2 and enables the latter to be attached to a fixed support 4, for example the chassis of a vehicle.

The connection between the rotating crown 3 and the fixed support 4 is made by a pivot link that incorporates at least one bearing 11 and which incorporates a rotating sealing device 5. This link allows the mechanical rotation of the crown 3 with respect to the support 4.

The vehicle is equipped with a tyre 6 inflation system which comprises an inflation/deflation control unit 7 which does not form the subject of the present and which is thus not described in great detail. This unit will classically incorporate a compressor, a pneumatic system to pilot the pressures for inflation and deflation and may include a vacuum pump for the deflation as well as electronic control means. The inflation/deflation system 6 also comprises a controlled valve 8 integral with the tyre 2a, and compressed air manifolds 9a and 9b.

A first manifold 9a takes the air from the inflation control unit 7 to the rotating sealing device 5, a second manifold 9b takes the compressed air from the sealing device 5 to the inflation/deflation valve 8.

The sealing device 5 thus enables the passage of compressed air intended for inflation from unit 7 to the tyre 2a, without leakage, despite the relative rotation of the wheel 1 with respect to the fixed support (or chassis) 4 around axis 10.

FIGS. 2a and 2b show a first embodiment of the rotating sealing device 5.

The rotating crown 3 is made here in the form of the assembly of two ring-shaped cages 3a and 3b which are made integral to one another by screws (not shown). The assembly of these cages 3a and 3b imprisons the exterior ring of a bearing 11.

The fixed support 4, made integral additionally with the vehicle chassis, is itself also integral with the interior ring of the bearing 11.

The joining of the bearing 11 and the support 4 is ensured by the installation of a rear nut 4a onto the support.

Thanks to the bearing 11, the crown 3 is able to rotate with respect to the support 4.

In accordance with the invention, a seal 12, made in the form of a ring, is placed between the fixed support 4 and the rotating crown 3.

This ring 12 is mounted able to slide along the rotational axis 10 in a circular groove 13 of the fixed support 4.

The ring 12 is delimited by two coaxial cylindrical surfaces, has a rectangular or square section and incorporates a front face 120 intended to come into contact with a bearing surface of the rotating crown 3.

The ring 12 is pressed against the bearing surface by positioning means exerting a thrust force on a rear face 121 of the ring 12. This thrust force is exerted along the direction of the pivotal axis 10. It makes the ring 12 slide in its groove 13 and presses the front face 120 of the ring 12 against the bearing surface of the rotating crown 3.

The ring 12 is preferably made of an organic material with a low coefficient of friction, such as polytetrafluoroethylene (or PTFE more commonly known under the trademark Teflon), a material with high graphite content. Such a composite material has a very low coefficient of friction and has good deformability qualities making it particularly well suited to the production of seals. The bearing surface of the crown 3 intended to accommodate the ring 12 will have been suitably machined to produce the airtightness required. Note that the roughness of the bearing surface will depend on the diameter of the ring 12. A ring 12 with a small diameter will require a surface with greater smoothness (rectified and polished). A ring 12 of a larger diameter will require greater roughness, namely to reduce the friction strain. Advantageously, the sealing ring may incorporate a metallic body onto which a bushing of an organic material with a low coefficient of friction, such as polytetrafluoroethylene, will be fixed.

To produce this bearing surface, as an alternative, a bushing of a material resistant to friction, such as silicon, may be fixed.

The ring 12 further incorporates a bore 14 (see FIG. 2b) connecting its rear face 121 to its front face 120. This bore 14 enables the passage of fluid pressure, through the ring 12, between the fixed support 4 and the rotating crown 3.

As can be seen in FIG. 2a, the manifold 9a is connected to a cannula 15 integral with the support 4. The cannula 15 is mounted able to slide in the bore 14 of the ring 12 and sealing is ensured by at least one O-ring 16 between the cannula 1 and the ring 12. Thus, the movement of the ring 12 by the action of the positioning means is not hindered by the cannula 15.

As can be seen in the Figures, and more particularly in FIG. 2c, the front face 120 of the ring 12 incorporates a circular median channel 17 in which the bore 14 opens out. Thus, the gas pressure conducted by the cannula 15 through the ring 12 is established in the whole channel 17 which forms a chamber whose airtightness is ensured by the ring 12 pressing against the rotating crown 3.

It can be seen in FIGS. 2a and 2b that the rotating crown 3 has a bore 18 that communicates with the channel 17. This bore 18 further receives the manifold 9b which conducts the gas pressure towards the tyre 2a. The hole 18 is positioned radially facing the channel 17. Thus, whatever the angular position of the crown 3 with respect to the support 4, the gas pressure from the cannula 1 is conducted to the bore 18 via the channel 17.

The Figures show that the airtightness is completed by different seals:
 a first rear mud-guard seal 19 arranged between the nut 4a of the support 4 and the shell 3b,
 a second mud-guard seal 20 between the front shell 2a and the support 4.

Furthermore, the airtightness of the ring 12 as it slides in its groove 13 is ensured by O-rings 21 and 22 on axis 10. These two seals 21 and 22 also enable the ring 12 to be immobilized in rotation in its groove 13.

An external seal 22 is arranged in a ring-shaped groove 23 with axis 10 made in the external cylindrical surface of the ring 12. An internal seal 21 is arranged in a ring-shaped groove 24 with axis 10 made in the internal cylindrical surface of the ring 12.

According to this first embodiment of the invention, the positioning means are constituted by fluid pressure applied against the rear face 121 of the ring 12.

This pressure is applied through an opening 25 in the support 4 (FIG. 2a). The opening 25 opens out into the ring-shaped groove 13 that receives the ring 12. As can be seen in FIG. 2a another cannula 26 is housed in the opening 25.

As seen in FIG. 1, the cannula 26 receives a manifold 27 connected to the inflation unit 7 through a pressure regulator 28 and a non-return valve 29.

Thus, when the tyre 2a is being inflated, a pressure level, which is calibrated by the regulator 28 at an appropriate value, is applied to the rear face 121 of the ring 12. The pressure level will depend in particular on the diameter of the ring 12.

This calibrated pressure enables the bearing force of the ring 12 against the crown 3 to be limited, thus limiting the resistive torque, the friction and the overheating of the ring 12.

The non-return valve 29 enables this pressure level to be maintained almost permanently (with the exception of any leaks) between the support 4 and the rear face 121 of the ring 12. The loss in pressure is made up every time the tyre 2a is reinflated.

By way of a variant, it is possible for a device to be defined according to the invention in which the pressure leaks between the support 4 and the rear face 121 of the ring are calibrated so as to ensure a rapid decrease in pressure after inflation. To this end, a calibrated opening 30 can be added between the ring-shaped groove 13 and the exterior, for example, positioned in parallel with the non-return valve 29 (see FIG. 1).

The advantage of this variant lies in that the frictional force of the ring 12 against the crown 3 drops very quickly after inflation as does the friction. This variant thus enables wear to be significantly reduced.

It suffers the drawback, however, of requiring more air to compensate for the leakage.

FIGS. 3a and 3b show a second embodiment of the invention which differs from the previous one essentially in the structure of the positioning means.

As can be seen in FIG. 3a, the support 4 no longer incorporates the opening 25 which enabled gas pressure to be applied to the rear face 121 of the ring 12.

According to this embodiment, the rear face 121 of the ring incorporates two circular grooves 31 and 33 with axis 10 that each accommodates an O-ring 32 or 34. Grooves 31, 33 and O-rings 32, 34 are dimensioned with respect to the groove 13 such that the O-rings 2, 34 are compressed whereas the front face 120 of the ring is applied against the crown 3.

The O-rings 32, 34 form spring means positioned between the rear face 121 of the ring 12 and the support 4.

FIGS. 3a and 3b also show that there is no cannula 15 introduced into the bore 14 in the ring 12 but that the manifold 9a is connected directly to a bore 35 in the support 4, to the rear of the ring 12. The cannula is no longer necessary since the positioning means 32, 34 does not use gas pressure in this embodiment.

When the gas pressure is applied by the manifold 9a to perform an inflation, this pressure is exerted firstly on a ring-shaped surface 36 of the rear face 121 (between the two O-rings 32 and 34) and secondly at the bottom of the median channel 17. To ensure airtightness, the ring 12 will be dimensioned such that the rear ring-shaped surface 36 is substantially of the same surface area as the bottom of the channel 17 in the front face 120. Thus, the pressures will balance each other out and the ring 12 is pressed against the crown 3 by a force resulting from the positioning means 32, 34 alone.

By design it is thus possible to calibrate the friction force of the ring 12 on the crown 3, and thus the pressure level ensured (as well as the friction undergone).

Depending on the operational constraints (diameter of the wheels, inflation pressures, etc.) it is possible to define a device according to the invention in which the spring means are of a different structure.

Thus, by way of example, FIG. 4 shows a device in which the spring means are constituted by at least one compressible metallic spring washer 37 that is positioned between the rear face 121 of the ring 12 ad the bottom of the groove 13 in the support 4.

Once again, the ring 12 will be defined such that the pressure exerted on the ring-shaped surface of the rear face 121 balances out the pressure exerted on the bottom of the channel 17. For this, the shape of the ring 12 and that of its groove 13 are modified whilst retaining the ring's axis of symmetry (10). In this case, the ring incorporates a ring-shaped rear part 12R with axis 10 that is of a thickness that is less than that of a front part 12F, also ring-shaped with axis 10. The front part 12F has the front face 120 and the rear part 12R has the rear face 121 onto which the spring means 37 press. The rear surface $S_2$ (surface of the rear face 121) is of a surface area equal to that of the surface $S_1$ of the bottom of the median channel 17.

Once again, the O-rings 21 and 22 enable both to ensure airtightness between the ring 12 and the groove 13 and also to immobilise the ring 12 in rotation in its groove 13.

O-rings 21 and 22 are carried by the rear part 12R of the ring 12.

FIG. 5 partially shows another embodiment of the invention in which the sealing device implements two coaxial rings 12a and 12b, which each have an axis of symmetry that is the spin axis 10 of the wheel. To simplify the drawing, the view here is limited (as for FIGS. 6 and 7) to a half section view. However, the axis 10 is shown so as to recall the symmetry of all the ring-shaped parts.

Each ring 12a or 12b incorporates on each of its internal and external cylindrical surfaces a ring-shaped groove with axis 10 receiving an O-ring. These O-rings enable the ring to be immobilised in rotation in its groove 13a or 13b.

The ring 12a thus has an O-ring 21a on its internal cylindrical surface and an O-ring 22a on its external cylindrical surface.

Ring 12b has an O-ring 21b on its internal cylindrical surface and an O-ring 22b on its external cylindrical surface. All the O-rings have axis 10 as their axis.

Each ring 12a, 12b is made of an organic material with a low coefficient of friction, such as polytetrafluoroethylene, a material with a high graphite content.

Each ring 12a, 12b is able to translate in its groove 13a or 13b in parallel to the axis of symmetry 10 which is the wheel axis). It is pressed to the bearing surface of the crown 3 by positioning means that exert a thrust force on the rear face 121a or 121b of the ring 12a or 12b.

According to the embodiment shown in FIG. 5, these positioning means are formed for each ring by a single O-ring 32a or 32b (with axis 10) housed in a groove arranged in the rear face 121a or 121b of each ring. The ring 12a thus carries O-ring 32a and ring 12b carries O-ring 32b.

A single O-ring is necessary on its each ring since here there is no gas pressure exerted on the rear faces 121a and 121b of the rings.

These O-rings act as spring means that ensure each ring 12a or 12b is pressed against the crown 3 using a calibrated force.

With this embodiment of the invention, the rings 12a and 12b do not have bores to allow the passage of the inflation fluid.

The manifold 9a for the air intake is linked to the bore that passes through the support 4 and opens out into a ring-shaped chamber 38 that is radially delimited by the rings 12a and 12b.

The bore 18 of the rotating crown 3 communicates with the ring-shaped chamber 38. The bore 18 further receives the manifold 9b which conducts the gas pressure towards the tyre 2a. The bore 18 is radially positioned facing the ring-shaped chamber 38. Thus, whatever the angular position of the crown 3 with respect to the support 4, the gas pressure coming from the manifold 9a is conducted to the bore 18 via the ring-shaped chamber 38.

This embodiment of the invention enables a bearing pressure to be ensured for the rings 12a, 12b that is separate from the pressure or negative pressure of use. It is, however, less compact than the embodiments described previously.

FIG. 6 shows a variant of this embodiment with two rings 12a, 12b, variant in which the spring means ensuring the positioning of each ring 12a, 12b are constituted by a compressible metallic spring washer 37a or 37b (with axis 10) that is placed between the rear face 121a or 121b of each ring and the bottom of its groove 13a or 13b in the support 4.

FIG. 7 shows another embodiment with two rings 12a, 12b in which the positioning means for each ring 12a, 12b are constituted by fluid pressure applied to the rear face of each ring through an opening 25a or 25b in the support 4. The openings 25a or 25b are connected in parallel to the same manifold 27 which is itself connected to the inflation unit 7 through a pressure regulator 28 and a non-return valve 29.

The mode of operation is analogous to that described previously with reference to FIGS. 2a and 2b: when the tyre 2a is being inflated, a pressure level calibrated by the regulator 28 is applied to the rear face of each ring 12a and 12b.

The non-return valve 29 enables this pressure level to be maintained almost permanently (with the exception of any leakages) between the support 4 and the rear faces of each ring 12a, 12b. The loss in pressure is made up every time the tyre 2a is reinflated.

There again a calibrated opening 30 (see FIG. 1) can be positioned between the ring-shaped grooves 13a, 13b and the exterior, for example in parallel with the non-return valve 29.

FIGS. 8a and 8b show another embodiment of a ring 12 with axis 10. In this Figure, the two cut parts of the ring 12 have been brought close together to produce a more compact Figure.

This ring differs from the previous ones in that it is formed of two parts. It thus incorporates a metallic body 39 (made, for example, of aluminium) onto which a bushing 40 is fixed of an organic material with a low coefficient of friction, for example polytetrafluoroethylene that may contain graphite). The bushing 40 is fixed to the body 39 by screws 41 evenly spaced angularly (here there are eight screws—see FIG. 8b). As can be seen in the Figures, the body 39 has ring-shaped grooves 23 and 24 that each receive sealing O-ring 21 or 22. The ring 12 here incorporates a bore 14 linking its rear face 121 and is front face 120. The bore 14 is partly made in the body 39 and partly in the bushing 40. The bore 14 opens out into the front face 120 in a circular median channel 17 made in the bushing 40.

Such an embodiment enables the friction characteristics of the ring 12 ensured by the bushing 40 alone to be dissociated from those of the mechanical strength and rigidity of the sliding ring 12 ensured by the body 39. This is particularly advantageous for sealing rings with large diameters or intended for intensive use.

It is naturally possible for the rings described previously to be made in two parts with reference to FIGS. 3a to 7 and which are not provided with a bore 14 or with rear spring means (32, 34, 37) ensuring their positioning.

The invention has been described within the scope of its application to a tyre inflating system. It is naturally possible for the invention to be implemented in other applications requiring a rotating seal and namely for those applications implementing fluids other than compressed air, for example: water, oils or hydrocarbons. The constitutive material of the seals and the ring will, in this case, be selected such as not to be deteriorated by the fluid.

The invention claimed is:

1. A rotating sealing device for the passage of a fluid, in particular for a system to inflate a tire of a vehicle, the rotating sealing device comprising:
   at least one seal positioned between a fixed support and a rotating crown mounted that (i) is integral with a wheel rim and (ii) is able to rotate with respect to the fixed support, the at least one seal comprising a ring mounted that is able to slide in a groove in the fixed support and which incorporates a front face intended to come into contact with a bearing surface of the rotating crown that is integral with the wheel rim, the ring being able to be pressed against the bearing surface by positioning means exerting a thrust force on a rear face of the ring, wherein the positioning means are constituted by fluid pressure applied to the rear face of the ring through an opening in the fixed support, wherein the ring incorporates on each of its internal and external cylindrical surfaces at least one ring-shaped groove intended to accommodate an O-ring seal, and
   wherein the ring comprises at least one bore that links the rear face of the ring and the front face of the ring;
   a cannula mounted in the at least one bore of the ring, wherein a length of the cannula extends axially within the at least one bore of the ring such that the cannula is able to slide axially within the at least one bore and conduct fluid therein.

2. The rotating sealing device according to claim 1, wherein the at least one bore enables a passage of a fluid pressure, through the ring, between the fixed support and the rotating crown.

3. The rotating sealing device according to claim 2, wherein the front face incorporates a circular median channel into which the at least one bore opens out.

4. The rotating sealing device according to claim 1, wherein the positioning means comprises spring means placed between the rear face of the ring and the fixed support.

5. The rotating sealing device according to claim 4, wherein the spring means comprises at least one spring washer.

6. The rotating sealing device according to claim 4, wherein the spring means comprises at least one O-ring housed in a circular groove arranged in the rear face of the ring.

7. The rotating sealing device according to claim 2, wherein the fluid pressure can be applied via a non-return valve and a pressure regulator, a certain pressure level being thus maintained between the fixed support and the rear face of the ring.

8. The rotating sealing device according to claim 7, wherein the ring incorporates a calibrated leak orifice connecting the ring-shaped groove and an exterior.

9. A sealing ring intended to be implemented in a rotating sealing device according to claim 1, the sealing ring incorporating a front face intended to come into contact with a rotating bearing surface and a rear face which is intended to receive a thrust force supplied by positioning means, wherein the sealing ring incorporates on each of internal and external cylindrical surfaces of the sealing ring at least one ring-shaped groove intended to accommodate an O-ring seal.

10. The sealing ring according to claim 9, wherein the at least one bore opening out on the front face into a circular median channel.

11. The sealing ring according to claim 10, wherein the sealing ring incorporates a ring-shaped rear part thinner than a ring-shaped front part, the surface area of the rear face being equal to that of a bottom of the circular median channel in the front face.

12. The sealing ring according to claim 9, wherein at least a part of the sealing ring comprises an organic material with a low coefficient of friction, such as polytetrafluoroethylene, a material with high graphite content.

13. The sealing ring according to claim 9, wherein the sealing ring incorporates a metallic body onto which a bushing of an organic material with a low coefficient of friction is fixed.

14. The rotating sealing device according to claim 1, wherein the rotating crown comprises two annular-shaped cages.

* * * * *